Nov. 15, 1955
LA VERNE F. BENTZEN
2,724,038
ADJUSTABLE WELDING TABLE
Filed Jan. 2, 1952
3 Sheets-Sheet 1
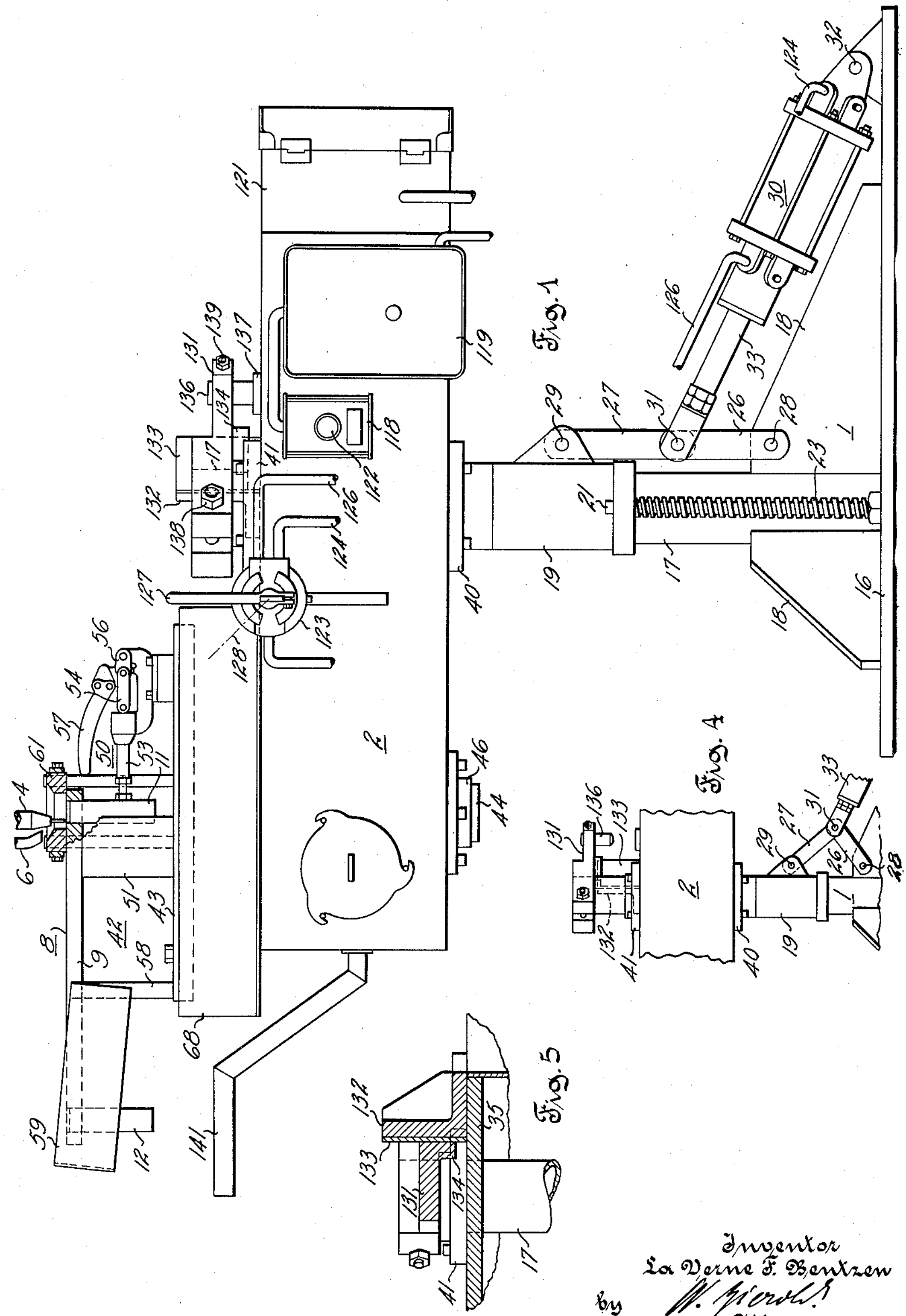
Inventor
La Verne F. Bentzen
by [signature]
Attorney Nov. 15, 1955 LA VERNE F. BENTZEN 2,724,038
ADJUSTABLE WELDING TABLE
Filed Jan. 2, 1952 3 Sheets-Sheet 2
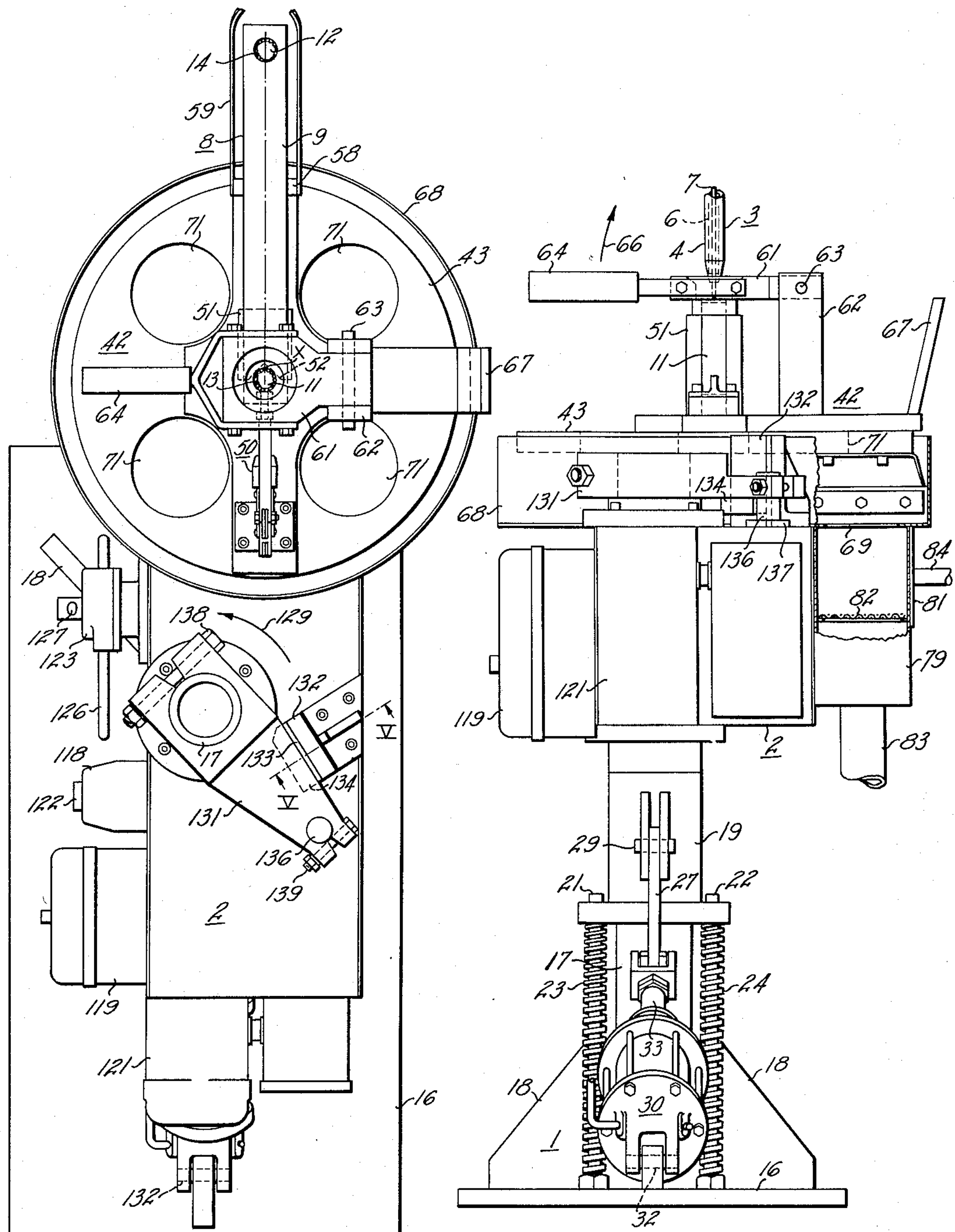
Inventor
La Verne F. Bentzen
by W. Pierold
Attorney Nov. 15, 1955 LA VERNE F BENTZEN 2,724,038
ADJUSTABLE WELDING TABLE
Filed Jan. 2, 1952 3 Sheets-Sheet 3
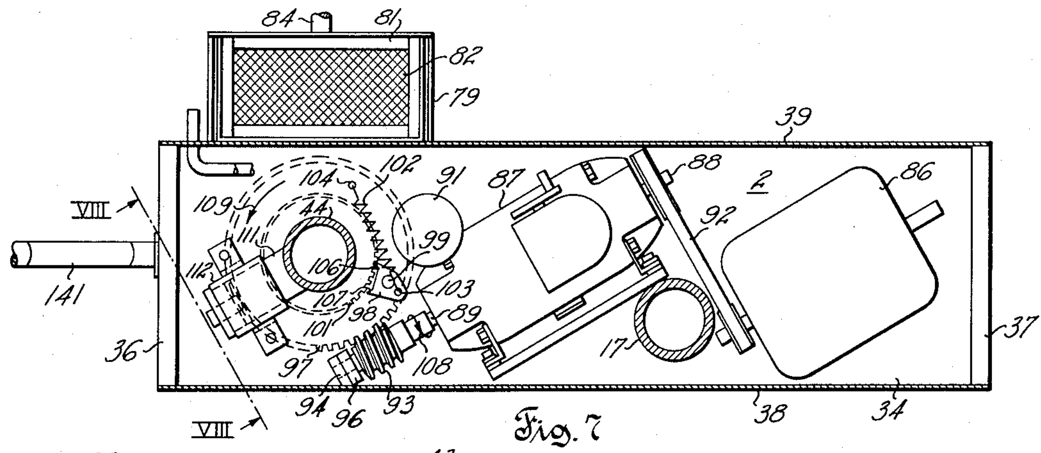
Fig. 7
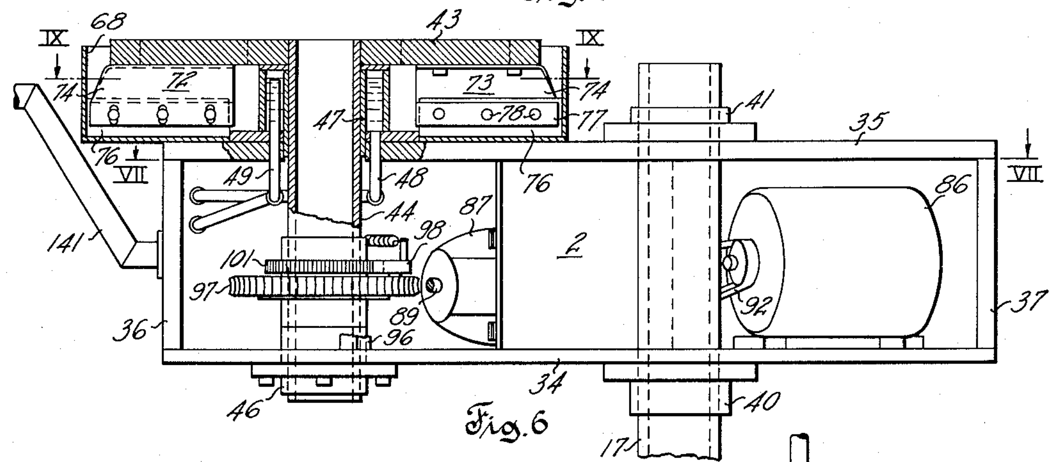
Fig. 6
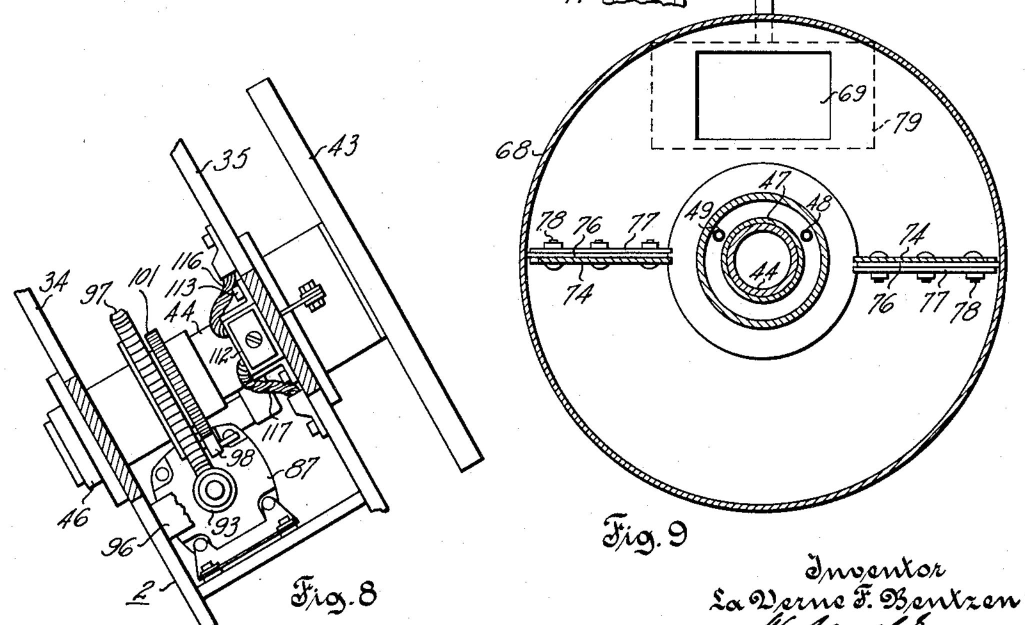
Fig. 8
Fig. 9
Inventor
La Verne F. Bentzen
by
Attorney United States Patent Office 2,724,038

Patented Nov. 15, 1955

2,724,038

ADJUSTABLE WELDING TABLE

La Verne F. Bentzen, La Crosse, Wis., assignor to Allis-Chalmers Manufacturing Company, Milwaukee, Wis.

Application January 2, 1952, Serial No. 264,399

17 Claims. (Cl. 219—17)

The invention relates to electric arc welding, and it is concerned more particularly with an automatic arc welding machine which comprises a stationary welding head and a movable work holder.

In order to place a circular weldment on a work piece it has heretofore been suggested to mount the work piece on a turntable and to perform the welding operation by feeding a welding electrode to the work piece while the latter is rotated in unison with the turntable. For mass production purposes it is desirable that the work piece can be mounted on and removed from the turntable with a minimum of time and effort, and that a repetitious welding cycle can be performed with a minimum of attention and effort on the part of the operator of the machine.

Generally, it is an object of the present invention to provide an improved arc welding machine which may be expeditiously loaded and unloaded between welding cycles, and which will take care of the other hereinabove outlined requirements in a practical and fully satisfactory manner.

More specifically, it is an object of the invention to provide an improved adjustable welding table by means of which a work piece can be swung under a stationary welding head, raised to a predetermined working position, rotated in raised position while the weld is being deposited, and be lowered and swung out from under the welding head after completion of the welding process.

Another object of the invention is to provide an improved welding table of the hereinabove outlined character which is particularly adapted for welding a flange or an arm to the end of an elongated member such as a pin or a shaft.

Another object of the invention is to provide an improved welding table which may be used for submerged arc welding operations and which permits convenient recovery of unused flux.

A still further object of the invention is to provide an improved welding table of the hereinabove outlined character in which a motor driven mechanism for rotating the work piece is constructed so as to permit proper indexing of the work piece before the beginning of the weld depositing process.

The foregoing and other objects and advantages are obtained by the present invention, various novel features of which will be apparent from the description herein and the accompanying drawings disclosing an embodiment of the invention, and will be more particularly pointed out in the appended claims.

Referring to the drawings:

Fig. 1 is a side elevation of an adjustable welding table and of part of a welding head in overlying relation to the table;

Fig. 2 is a top view of the welding table shown in Fig. 1, the welding head being omitted in Fig. 2;

Fig. 3 is an end elevation of the welding table and of the welding head part shown in Fig. 1;

Fig. 4 is a partial side view, at a reduced scale, of the welding table shown in Fig. 1, parts of the table shown in Fig. 4 being adjusted to a relative vertical position different from that in which they are shown in Fig. 1;

Fig. 5 is a partial sectional view on line V—V of Fig. 2;

Fig. 6 is a side view, partly in section, of the upper part of the table shown in Fig. 1, with parts of the table removed for purposes of exposure;

Fig. 7 is a sectional top view of the upper part of the table shown in Fig. 6, the view of Fig. 7 being taken on line VII—VII of Fig. 6 with parts omitted for purposes of exposure;

Fig. 8 is an end view, partly in section, of the upper part of the table shown in Figs. 6 and 7, with parts omitted for purposes of exposure, the view of Fig. 8 being taken generally in the direction of arrows VIII—VIII in Fig. 7; and Fig. 9 is a sectional view on line IX—IX in Fig. 6.

Referring to Figs. 1 and 3, the welding table as shown in these figures comprises a pedestal generally designated by the reference character 1 and a swing frame generally designated by the reference character 2, the swing frame being adjustably mounted on the pedestal for rotation on a vertical axis and also for vertical back and forth movement between raised and lowered positions as will appear more fully hereinbelow. The table comprising the pedestal 1 and swing frame 2 forms part of a welding machine the rest of which is not shown herein, except for part of a standard "Lincoln" welding head which is shown at the top of Figs. 1 and 3 and generally designated in Fig. 3 by the reference character 3. The welding head 3 is mounted in a fixed position above the pedestal 1 on a suitable frame structure, not shown, and comprises an electrode guide 4, and a flux delivery spout 6. A welding wire 7 passes through the electrode guide 4 and is fed toward a work piece 8 on the welding table by suitable mechanism of well known construction, not shown.

The work piece 8 comprises a plate metal strap 9, and two cylindrical pins 11 and 12 which are press fitted into holes at the opposite ends, respectively, of the strap 9. The welding operation to be performed on the work piece 8 is to deposit a circular weldment 13 at the upper side of the plate 9 along the edge of the hole which is occupied by the pin 11, and to place another circular weldment 14 at the upper side of the plate 9 along the edge of the hole which is occupied by the pin 12, the purpose being to permanently secure the pins 11 and 12 to the strap 9 in the positions relative thereto and relative to each other in which they are shown in Fig. 1.

The pedestal 1 comprises a base plate 16 and a cylindrical tubular column 17 which is secured in a vertical position on the base plate 16 and braced by gusset plates 18. The column 17 is surrounded by an up and down movable lift element in the form of a collar 19 which is slidable axially of the column and guided on a pair of guide rods 21 and 22 extending upwardly from the base plate 16 and through suitable flange portions at the lower end of the collar 19. As shown in Fig. 3, the guide rods 21 and 22 are surrounded by coil springs 23 and 24, respectively, which yieldingly urge the collar 19 upwardly relative to the column 17.

A pair of toggle links 26 and 27 are pivotally secured at 28 and 29 to the pedestal 1 and to the collar 19, and a pivot pin 31 connects the adjacent ends of the toggle links with each other. A double acting pneumatic ram 30 is operatively interposed between the pedestal and the toggle links for operating the latter, the ram comprising a cylinder pivoted at 32 on the base plate of the pedestal 1, and a piston rod 33 connected with the pivot pin 31. In the position of the parts as shown in Fig. 1, the pneumatic ram 30 is fully extended and the toggle links are in dead center position so as to positively prevent downward movement of the collar 19 from the position in which it is shown in Fig. 1.

As shown in Figs. 1 and 4, the swing frame 2 rests on top of the collar 19, and as shown in Figs. 6, 7 and 8, a box shaped body of the swing frame comprises a bottom plate 34, a top plate 35, end plates 36, 37, and removable side plates 38 and 39. The column 17 extends through vertically aligned apertures in the top and bottom plates 34 and 35, and bearing collars 40 and 41 are secured to the plates 34 and 35, respectively, and cooperate with the column 17 to connect the swing frame with the pedestal for horizontal rotary and vertical translatory movement relative thereto.

Referring to Figs. 1, 2, 3 and 6, a work holder, generally designated by the reference character 42, comprises a table disk 43 which is rotatably mounted on the swing frame by means of a tubular shaft 44. A bearing 46 for the shaft 44 is secured in an aperture of the bottom plate 34 of the frame, and another bearing 47 for the shaft 44 is secured in vertical alignment with the bearing 46 in a bearing aperture of the upper plate 35 of the swing frame. The upper bearing 47 is jacketed to provide an annular space for the passage of cooling water therethrough which may be admitted through an inlet pipe 48, and emitted through an outlet pipe 49. The purpose of cooling the bearing 47 is to carry off excessive heat which may pass from the work piece to the welding table.

On top of the table disk 43, a block 51 (Fig. 1) is secured in offset relation to the axis of the tubular shaft 44. As best shown in Fig. 2, the block 51 has a vertical V-groove 52, and when the work piece 8 is placed into the position on the block 51, in which it is shown in Figs. 1 and 2, the pin 11 of the work piece will be seated in the groove 52 in accurately centered position with reference to the axis of the tubular shaft 44. A toggle clamp 50 for wedging the pin 11 into the V-groove 52 is mounted on top of the table disk 43 and comprises a reciprocable plunger 53 and toggle links 54 and 56 which may be operated by a handle 57 so as to either advance the plunger 53 against or retract it from the pin 11.

In addition to the block 51, the table disk 43 mounts a bracket plate 58 for supporting the work piece 8 in the position in which it is shown in Fig. 1. A U-shaped guard 59 is secured to the bracket plate 58 so as to surround the end of the work piece in which the pin 12 is mounted and which will be very hot after the pin 12 has been secured in position by welding.

Also mounted on top of the table disk 43 is a flux dam 61 which, as best shown in Fig. 3, is pivoted on a bracket structure 62 by means of a pivot pin 63. In the position of the dam 61, as shown in Figs. 1 and 3, flux from the delivery spout 6 may be fed into the apertured portion of the dam which overlies the part of the work piece on which the welding operation is to be performed. The dam has a handle 64 by means of which it may be swung on the pivot pin 63 in the direction of arrow 66 in Fig. 3 in order to clear the work piece preparatory to its removal from the welding table. During the initial stage of such dam swinging the accumulated flux will spill over the work piece and over the table disk 43. A stop 67 is secured to the table disk to support the dam after it has been swung 180° from the position in which it is shown in Fig. 3.

As shown in Figs. 6 and 9, the table disk 43 is surrounded by a flux collecting pan 68 which is rigidly secured to the top plate 35 of the swing frame and has a bottom aperture 69 in a portion thereof which, as shown in Fig. 3, overhangs the swing frame at one side. The flux which spills over the work piece when the dam 61 is lifted, as explained hereinbefore, passes through apertures 71 (Fig. 2) of the table disk into the collecting pan 68. The table disk 43 is provided with two flux sweepers 72 and 73 which are secured to the under side of the table disk in diametrically opposed positions. Each sweeper consists of a plate metal bracket 74 which is bolted to the table disk, a leather strap 76, a retainer plate 77 for the strap 76, and a series of bolts 78 by means of which the retainer plate 77 and the strap 76 are secured to the bracket plate 74 so that the strap 76 contacts the bottom wall of the pan. The bolts 78 are vertically adjustable in slotted apertures of the bracket plate 74 and permit adjustment of the leather strap 76 for wear compensation. During the welding process, the table disk 43 is rotated on the axis of the tubular shaft 44, as will be explained more fully hereinbelow, and flux which has been spilled into the pan 68 will be swept into the bottom aperture 69 of the pan by the rotating sweepers 72 and 73. From the bottom aperture 69, the flux drops into a chute 79 which, as shown in Fig. 3, is mounted on the swing frame. A drawer 81 is slidably mounted in the chute 79 and has a wire mesh bottom 82 for intercepting metal slugs which may pass into the chute together with the flux. A flexible tube 83 is secured to the bottom of the chute 79 and leads to a flux storage hopper, not shown. The reclaimed flux after passing through the screen 82 enters the tube 83 and is returned through the latter to the flux storage hopper by a suction mechanism, not shown. The drawer 81 has a handle 84 and may be periodically removed to clean out accumulated slugs.

The mechanism for rotating the table disk 43 and its associated parts relative to the swing frame on the axis of shaft 44 is enclosed within the box structure afforded by the top and bottom plates 34, 35, end plates 36, 37 and side plates 38 and 39. As best shown in Figs. 6, 7 and 8, the drive mechanism for the disk 43 comprises an electric motor 86, a variable speed transmission 87 and a gear and ratchet mechanism which is shown in the left part of Figs. 6 and 7 and serves to transmit power from the variable speed transmission to the tubular shaft 44. The variable speed transmission 87 has an input shaft 88, an output shaft 89, and an internal hydraulic mechanism, not shown, which is of a well-known type to permit selective variation of the transmission ratio between the input shaft 88 and the output shaft 89. An oil reservoir indicated at 91 in Fig. 7 forms part of the variable speed transmission 87. A V-belt drive 92 connects the electric motor 86 in driving relation with the input shaft 88 of the variable speed transmission 87.

The output shaft 89 of the variable speed transmission 87 drives a worm 93 which is journaled in a bearing 94 on a vertical support member 96. The worm 93 meshes with a worm gear 97 which, as best shown in Fig. 6, is mounted on the swing frame for rotation coaxially with and relative to the tubular support shaft 44 for the table disk 43. A ratchet pawl 98 (Fig. 7) is pivotally mounted on the worm gear 97 by means of a stud 99, and the pawl 98 cooperates with a ratchet wheel 101 which in turn is mounted on the tubular shaft 44. The ratchet wheel 101 is secured to the shaft 44 in axially and rotatively fixed position.

Referring to Fig. 7, an overcenter spring 102 is hooked at one end to a stud 103 on the pawl 98 and at its other end to a stud 104 on the worm gear 97. The pawl 98 has two points 106 and 107, and in the position of the parts, as shown in Fig. 7, the overcenter spring 102 is operative to urge the point 106 into cooperative engagement with the ratchet wheel 101.

Assuming that the worm 93 is rotated in the direction of arrow 108, in Fig. 7, it will be noted that as a result of such rotation of the worm 93 the gear 97 will be rotated in the direction of arrow 109, and that such rotation of the worm gear 97 will be transmitted by the pawl 98 to the ratchet wheel 101 which, as stated, is fixedly secured to the shaft 44. Accordingly, the table disk 43 will be rotated in the direction of arrow 109 when the worm 93 is rotated by motor power in the direction of arrow 108. It will further be noted that the ratchet mechanism comprising the pawl 98 and the ratchet wheel 101, when adjusted to the operative condition in which it is shown in Fig. 7, affords a one-way driving connection which permits rotation of the table disk 43 in the direction of arrow 109 while the worm 93 is standing still.

As will be explained more fully hereinbelow, it is desirable, for indexing purposes, that the table disk 43 can be rotated independently of the worm 93, and it is also desirable that the table disk 43 be rotatable by motor power either in the direction of arrow 109 or in the opposite direction. In order to rotate the table disk 43 by motor power in the direction opposite to that which is indicated by the arrow 109, the pawl 98 is turned by hand into a position in which the overcenter spring 102 will be effective to urge the pawl point 107 into cooperative engagement with the ratchet wheel 101. In this last mentioned condition of the pawl it will be possible to manually rotate the table disk 43 and associated parts in a direction opposite to arrow 109 while the worm gear 93 is standing still. As actually constructed, the pawl and ratchet mechanism may have one or more additional pawls, similar to the pawl 98, at circumferentially spaced points on the worm gear 97.

Referring to Figs. 7 and 8, a spring loaded carbon brush 111 is mounted in a socket member 112 which is rigidly secured by cap screws 113 to the under side of the swing frame plate 35. Two cables 116 and 117 are connected with the brush and are grounded through connections with the top plate 35. The brush 111 contacts the shaft 44 and, with the cables 116 and 117, provides a path to ground any static electricity generated by the mechanism.

Also mounted on the swing frame 2 are electrical controls for the motor 86 and for the welding circuit, such controls being of conventional construction and therefore not shown or described in detail. Housings 118, 119 and 121, generally indicated in Figs. 1 and 2, enclose various parts of the electrical control system, and a starter button is indicated at 122.

Also mounted on the swing frame 2 is a manually operable valve 123 for controlling the pneumatic ram 30. The valve 123 is connected with a source of air pressure, such as a compressor, not shown, and conduits 124 and 126 connect the valve with cylinder ports of the ram 30. A manually operable control lever 127 for the valve 123 is shown in Fig. 1 in a position in which the ram 30 is operative to hold the toggle links 26 and 27 in the dead center position in which they are shown in Fig. 1. Movement of the control lever 127 to the position which is indicated in Fig. 1 by the dash-dotted line 128 causes the pneumatic ram 30 to contract and consequent collapse of the toggle mechanism 26 and 27, as indicated in Fig. 4. Downward movement of the collar 19 which is caused by the collapse of the toggle links 26 and 27, results in a corresponding downward movement of the swing frame 2 to the lowered position in which it is shown in Fig. 4. As explained hereinbefore, the swing frame 2 is rotatable on the pedestal 1 about the column 17, and while the swing frame is in the lowered condition in which it is shown in Fig. 4, it can be swung out from under the welding head 3 about the column 17 in the direction of arrow 129 in Fig. 2. After the swing frame has thus been rotated out from under the welding head, the dam 61 may be swung back on the pivot 63 to clear the work piece 8, and the latter may readily be lifted from the block 51 and bracket 58 after the toggle clamp 50 has been released.

After a new work piece has been placed on the block 51 and strap 58 while the swing frame is in its lowered position and swung out from under the welding head, the operator may throw the dam 61 over the work piece and then rotate the swing frame, in its lowered condition, back under the welding head. In order to arrest the swing frame in an accurately determined position under the welding head, an arm 131 (Fig. 2) is rigidly secured to the upper end of the column 17, and an angle bracket 132 is rigidly secured to the top plate 35 of the swing frame for cooperative engagement with the arm 131. As shown in Fig. 5, the angle bracket 132 has a vertical slide surface 133 on an upstanding leg of the bracket, and as shown in Fig. 5, the slide surface 133 abuts a block 134 on the arm 131 when the swing frame is rotated in its lowered condition to the position relative to the pedestal, in which it is shown in Fig. 2, and which places the work piece 8 directly under, but at a vertical distance from the welding head 3. Subsequent actuation of the ram 30 so as to raise the swing frame to the position in which it is shown in Fig. 1 will cause the slide surface 133 on the upstanding part of the bracket 132 to move upward relative to and in contact with the arm 131, as indicated in Fig. 5.

Locking means comprising a male part in the form of a pin 136 and a female part in the form of a bushing 137, are operatively interposed between the pedestal 1 and the swing frame 2 so as to automatically secure the swing frame against rotation after it has been moved to the predetermined rotatively adjusted position in which it is shown in Fig. 2, and after it has been adjusted in that position from the lowered condition in which it is shown in Fig. 4 to the raised condition in which it is shown in Figs. 1 and 3.

The arm 131 has a circular opening at one end to receive the upper end of the column 17, and as shown in Fig. 2, the end of the arm 131 which receives the column 17 is split and securely clamped upon the column by a bolt and nut 138. The radially outer end of the arm 131 is also split and has a hole for the reception of the locking pin 136. A bolt 139 extends through the split radially outer end portion of the arm and is drawn up by a nut so as to secure the pin 136 in the depending position on the arm in which it is shown in Fig. 4. The bushing 137 is mounted in a hole of the swing frame top plate 35, and when the swing frame is lowered by actuation of the ram 30, as indicated in Fig. 4, the bushing 137 recedes from the pin, and as a result, the swing frame is automatically released for rotation upon movement from its raised to its lowered condition.

Figs. 1 and 2 show the position which the work piece 8 occupies relative to the welding wire 7 at the beginning of the welding operation, and the reference character X in Fig. 2 marks the spot on the work piece 8 where the arc is struck when the operator pushes the control button 122. Automatic control devices, not shown, are incorporated in the electrical system and function to start the motor 86 when the button 122 is depressed. The automatic control devices keep the motor running for a predetermined length of time so that the work piece will be rotated on the axis of the tubular shaft 44, and at the same time the welding wire is automatically fed to the work piece so that the circular weldment 13 will be deposited on the upper side of the work piece along the edge of the hole of the strap 9 in which the pin 11 is mounted. If a heavy weldment is desired the motor is timed to run for a length of time sufficient to complete two or more full revolutions of the work piece. The timing of the motor is further such that the work piece, after completing a full turn, or a number of full turns, as the case may be, makes an additional fraction of a turn so that the end of the circular weld will overlap the starting point X. The automatic control devices interrupt the motor circuit and the welding circuit after completion of the weld depositing process, so that the work piece comes to rest and the arc is extinguished.

After rotation of the work piece has stopped the operator moves the control lever of the valve 123 into the lowering position which is indicated by the dash-dotted line 128, and as a result, the swing frame and work piece will vertically recede from the welding head 3 and come to rest in the position indicated in Fig. 4. The operator may then take hold of a handle 141 (Fig. 1) on the swing frame and pull on it so as to rotate the swing frame and work piece in the direction of arrow 129 out from under the welding head. Ample head room will then be available above the swing frame so that the flux dam 61 can be swung out of the way on the pivot pin 63 (Fig. 3) and the toggle clamp 50 can be released by upward swinging of the handle 57.

After the dam has been swung back upon the stop 57 (Fig. 3) and the toggle clamp 50 has been released, the operator may take hold of the strap 9 and turn the work piece around so that the pin 12 will be positioned in the vertical V-groove of the block 51. After tightening the toggle clamp and moving the dam 61 back over the work piece, the operator may then push the swing frame and the work piece back under the welding head. Such movement will be stopped when the bracket or stop 132 contacts the arm or abutment 131, and the swing frame will therefore be prevented from overtraveling the exact poition relative to the arm 131 in which it is shown in Fig. 2.

As the next step, the operator will move the control lever 127 of the valve 123 to the position in which the lever is shown in Fig. 1, and as a result the swing frame and work piece will move up toward the welding head.

Due to the fact that during the preceding welding operation the table disk 43 has been rotated an additional fractional turn, as has been mentioned hereinbefore, the work piece when swung back under the welding head, with the pin 12 seated in the V-groove 52, will be rotatively displaced from the position in which the work piece 8 is shown in Fig. 2. In order to properly index the work piece relative to the welding wire before the starter button 122 is pushed, the operator may take hold of the guard 59, or any other suitable part on the disk 43, and turn the latter by hand in the direction of arrow 129 in Fig. 2, until the connecting line between the centers of the pins 11 and 12 arrives in the position relative to the swing frame in which it is shown in Fig. 2, and in which position the weld will be started midway between the longitudinal edges of the strap 9. Such indexing adjustment of the work piece is made possible by the ratchet mechanism or one-way drive which includes the pawl 98 and the ratchet wheel 101. The operating cycle which deposits the weldment 14 for securing the pin 12 on the strap 9, is the same as described hereinbefore with reference to the pin 11.

The herein disclosed adjustable welding table readily lends itself for use in placing circular welds on work pieces of different shape than the work piece 8. The tubular shaft 44 is open at both ends, and provides a vertical passage which may accommodate a shaft or other elongated member to which a flange or arm is to be secured by welding. In order to alter the diameter of the weld, the welding head may be arranged for adjustment radially of the shaft 44. The variable speed transmission 87 may conveniently be adjusted to insure proper welding speeds for welds of different diameters.

It should be understood that it is not intended to limit the invention to the particular forms and details described hereinabove and that the invention includes such other forms and modifications as are embraced by the scope of the appended claims.

It is claimed and desired to secure by Letters Patent:

1. A welding table comprising, in combination, a base structure, an upright column member rigidly secured at its lower end to said base structure, a swing frame operatively connected with said column member for horizontal rotary and vertical translatory movement relative thereto, a work holder mounted on said swing frame in radially spaced relation to said column member for movement about the latter in unison with said swing frame, and actuating means selectively operable to raise and lower said swing frame relative to said column member, said actuating means comprising a lift element operatively mounted on said column member for up and down movement relative thereto and having a portion in vertical load transmitting, rotatable engagement with said swing frame so that said swing frame will be rotatably sustained in its lowered condition for movement about said column member from one rotatively adjusted position to another.

2. A welding table comprising, in combination, a base structure, an upright column member rigidly secured at its lower end to said base structure, a swing frame operatively connected with said column member for horizontal rotary and vertical translatory movement relative thereto, a work holder, bearing means operatively mounting said work holder on said swing frame for rotation on a generally vertical axis in radially spaced relation to said column member, a motor mounted on said swing frame and connected in driving relation with said work holder for rotating the latter relative to said swing frame, and actuating means selectively operable to raise and lower said swing frame relative to said column member, said actuating means comprising a lift element operatively mounted on said column member for up and down movement relative thereto and having a portion in vertical load transmitting, rotatable engagement wtih said swing frame so that said swing frame will be rotatably sustained in its lowered condition for movement about said column member from one rotatively adjusted position to another.

3. A welding table as set forth in claim 2 and further comprising a flux collecting pan surrounding said work holder and having an open top and a flux discharge opening at its bottom, means rigidly securing said flux collecting pan to said swing frame, and wiper means connected with said work holder and operative to sweep past said discharge opening so that flux entering said pan will be discharged from the latter by rotation of said wiper means.

4. A welding table comprising, in combination, a pedestal, a swing frame, pivot means operatively interposed between said pedestal and swing frame on a vertical axis and permitting up and down translatory movement of said swing frame relative to said pedestal, a tubular member rotatably mounted on said swing frame in radially spaced relation to the axis of said pivot means and affording a vertical passage for the reception of a work piece, work holding means connected with said tubular member for rotation in unison therewith relative to said swing frame, a motor mounted on said swing frame and connected in driving relation with said tubular member, and actuating means selectively operable to raise and lower said swing frame relative to said pedestal, said actuating means comprising a lift element operatively mounted on said pedestal for up and down movement relative thereto and having a portion in vertical load transmitting, rotatable engagement with said swing frame so that said swing frame will be rotatably sustained in its lowered condition for movement about said pedestal from one rotatively adjusted position to another.

5. A welding table comprising, in combination, a pedestal, a swing frame, pivot means operatively interposed between said pedestal and said swing frame on a vertical axis and permitting rotary and vertical translatory movement of said swing frame relative to said pedestal, a work holder mounted on said swing frame for rotary and translatory movement in unison therewith relative to said pedestal and for rotation relative to said swing frame on a vertical axis in radially spaced relation to the axis of said pivot means, actuating means selectively operable to raise and lower said swing frame relative to said pedestal, said actuating means comprising a lift element operatively mounted on said pedestal for up and down movement relative thereto and having a portion in vertical load transmitting, rotatable engagement with said swing frame so that said swing frame will be rotatably sustained in its lowered condition for movement about said pedestal from one rotatively adjusted position to another; an abutment on said pedestal, and a stop formed on said swing frame and cooperable with said abutment to determine said one rotatively adjusted position of said swing frame in said lowered condition of the latter.

6. A welding table as set forth in claim 5, in which said stop has a vertically elongated slide surface adapted to engage said abutment while said swing frame is raised and lowered relative to said pedestal upon adjustment to said one rotatively adjusted position.

7. A welding table comprising, in combiantion, a pedestal, a swing frame, pivot means operatively interposed between said pedestal and said swing frame on a vertical axis and permitting rotary and vertical translatory movement of said swing frame relative to said pedestal, a work holder mounted on said swing frame for rotary and translatory movement in unison therewith relative to said pedestal and for rotation relative to said swing frame on a vertical axis in radially spaced relation to the axis of said pivot means, actuating means selectively operable to raise and lower said swing frame relative to said pedestal, said actuating means comprising a lift element operatively mounted on said pedestal for up and down movement relative thereto and having a portion in vertical load transmitting, rotatable engagement with said swing frame so that said swing frame will be rotatably sustained in its lowered condition for movement about said column member from one rotatively adjusted position to another; and locking means operatively interposed between said pedestal and swing frame so as to automatically secure said swing frame against rotation after it has been moved to said one rotatively adjusted position and adjusted in said position from its lowered to its raised condition, and so as to automatically release said swing frame for rotation upon movement thereof from its raised to its lowered condition.

8. A welding table as set forth in claim 7 in which said locking means comprise a male part and a female part, one secured to said pedestal and the other secured to said swing frame so that said parts will move into and out of cooperative engagement with each other by upward and downward movements, respectively, of said swing frame relative to said pedestal.

9. A welding table as set forth in claim 8, in which said pedestal has a horizontally extending arm, and in which a pin member forming said male part is mounted in depending position on said arm, said swing frame having an apertured portion adapted to receive said pin member upon adjustment of said swing frame from its lowered to its raised condition.

10. A welding table comprising, in combination, a pedestal, a swing frame, pivot means operatively interposed between said pedestal and said swing frame on a vertical axis and permiting rotary and vertical translatory movement of said swing frame relative to said pedestal, a work holder mounted on said swing frame for rotary and translatory movement in unison therewith relative to said pedestal and for rotation relative to said swing frame on a vertical axis in radially spaced relation to the axis of said pivot means, actuating means selectively operable to raise and lower said swing frame relative to said pedestal, said actuating means comprising a lift element operatively mounted on said pedestal for up and down movement relative thereto and having a portion in vertical load transmitting, rotatable engagement with said swing frame so that said swing frame will be rotatably sustained in its lowered condition for movement about said pedestal from one rotatively adjusted position to another; an abutment on said pedestal, a stop formed on said swing frame and cooperable with said abutment to determine said one rotatively adjusted position of said swing frame, and locking means operatively interposed between said pedestal and swing frame so as to automatically secure said swing frame against rotation after it has been moved to said one rotatively adjusted position and adjusted in said position from its lowered to its raised condition, and so as to automatically release said swing frame for rotation upon movement thereof from its raised to its lowered condition.

11. A welding table comprising, in combination, a pedestal, a swing frame, pivot means operatively interposed between said pedestal and said swing frame on a vertical axis and permiting rotary and vertical translatory movement of said swing frame relative to said pedestal, actuating means selectively operable to raise and lower said swing frame relative to said pedestal, said actuating means comprising a lift element operatively mounted on said pedestal for up and down movement relative thereto and having a portion in vertical load transmitting, rotatable engagement with said swing frame so that said swing frame will be rotatably sustained in its lowered condition for movement about said pedestal from one rotatively adjusted position to another; a work holder, bearing means rotatably mounting said work holder on said swing frame in radially spaced relation to the axis of said pivot means, a motor mounted on said swing frame, and power transmitting means affording a one-way driving connection operatively interposed between said motor and said work holder.

12. A welding table comprising, in combination, a pedestal, a swing frame, pivot means operatively interposed between said pedestal and said swing frame on a vertical axis and permitting rotary and vertical translatory movement of said swing frame relative to said pedestal, actuating means selectively operable to raise and lower said swing frame relative to said pedestal, said actuating means comprising a lift element operatively mounted on said pedestal for up and down movement relative thereto and having a portion in vertical load transmitting, rotatable engagement with said swing frame so that said swing frame will be rotatably sustained in its lowered condition for movement about said pedestal from one rotatively adjusted position to another; a work holder, bearing means rotatably mounting said work holder on said swing frame in radially spaced relation to the axis of said pivot means, a motor mounted on said swing frame, a worm element connected in driven relation with said motor, a worm gear in mesh with said worm element and mounted on said swing frame for rotation coaxially with and relative to said work holder, a ratchet pawl pivotally mounted on said worm gear, and a ratchet wheel operatively engaged by said pawl and connected with said work holder for rotation in unison therewith relative to said swing frame.

13. A welding table as set forth in claim 12, in which said pawl has two points for alternate engagement with said ratchet wheel, and in which an overcenter spring is operatively interposed between said pawl and said worm wheel and effective to urge either one or the other of said pawl points into cooperative engagement with said ratchet wheel.

14. A welding table comprising, in combination, a pedestal, a swing frame, pivot means operatively interposed between said pedestal and said swing frame on a vertical axis and permitting rotary and vertical translatory movement of said swing frame relative to said pedestal, actuating means selectively operable to raise and lower said swing frame relative to said pedestal, said actuating means comprising a lift element operatively mounted on said pedestal for up and down movement relative thereto and having a portion in vertical load transmitting, rotatable engagement with said swing frame so that said swing frame will be rotatably sustained in its lowered condition for movement about said pedestal from one rotatively adjusted position to another; a work holder, bearing means rotatably mounting said work holder on said swing frame in radially spaced relation to the axis of said pivot means, a motor mounted on said swing frame, a motor driven element rotatably mounted on said swing frame, and a power transmitting mechanism operatively interposed between said motor driven element and said work holder and selectively adjustable to a first operating condition in which it is effective to transmit rotation of said motor driven element in one direction to said work holder and permit rotation of said work holder in said one direction while said motor driven element is standing still, or to a second operating condition in which said mechanism is effective to transmit rotation of said motor driven element in the other direction to said work holder and permit rotation of said work holder in said other direction while said motor driven element is standing still.

15. In a welding machine, the combination of a stationary welding head, a pedestal fixedly mounted in underlying relation to said welding head, a swing frame, pivot means operatively interposed between said pedestal and said swing frame on a vertical axis and permitting rotary and vertical translatory movement of said swing frame relative to said pedestal, a work holder rotatably mounted on said swing frame on an axis in radially spaced relation to the axis of said pivot means and adapted to occupy an operative position directly under said welding head while said swing frame occupies a predetermined raised, rotatively adjusted position on said pedestal, and actuating means selectively operable to raise and lower said swing frame relative to said pedestal, said actuating means comprising a lift element operatively mounted on said pedestal for up and down movement relative thereto and having a portion in vertical load transmitting engagement with said swing frame so that said swing frame will be rotatably sustained in its lowered condition for movement about said pedestal into and out of said predetermined rotatively adjusted position.

16. In a welding machine as set forth in claim 15, a vertical column forming part of said pedestal, bearing means connecting said swing frame with said column for horizontal rotary and vertical translatory movement relative thereto, a collar slidably mounted on said column in underlying and rotatable relation to said swing frame, a pair of toggle links pivotally connected, respectively, with said pedestal and with said collar, pivot means connecting said toggle links with each other, and an expansible and contractable fluid operated ram operatively connected with said pedestal and with said toggle links for operating the latter.

17. In a welding machine as set forth in claim 16, an arm extending radially from said column and secured to the latter in overlying relation to said swing frame, and a locking pin secured to and depending from said arm, said swing frame having an apertured top member adapted to receive said locking pin upon raising of said swing frame in said predetermined angularly adjusted position of the latter.

References Cited in the file of this patent

UNITED STATES PATENTS

| | | |
|---|---|---|
| 1,141,517 | Andrews | June 1, 1915 |
| 1,550,651 | Charter | Aug. 18, 1925 |
| 1,940,331 | Smith | Dec. 19, 1933 |
| 2,194,101 | Spatta | Mar. 19, 1940 |
| 2,264,496 | Wollentin et al. | Dec. 2, 1941 |
| 2,303,720 | Berkeley | Dec. 1, 1942 |